INVENTOR.
HAROLD A. BRILL
BY
ATTORNEY

United States Patent Office 3,489,482
Patented Jan. 13, 1970

3,489,482
IMAGE TRANSMISSION THROUGH A FIBER OPTICS DEVICE
Harold A. Brill, Cherry Hill, N.J., assignor to RCA, a corporation of Delaware
Filed Sept. 25, 1964, Ser. No. 399,208
Int. Cl. G02b 5/16
U.S. Cl. 350—96     3 Claims

ABSTRACT OF THE DISCLOSURE

The fiber optics device of this disclosure includes an output face and one or more input faces and the arrangement of fibers need not be the same at these faces. It is made by coating an input face with a light-sensitive material and then projecting a negative of an image onto the output face of the device. The exposed light-sensitive medium is then developed and fixed. To operate the device, light is shined through the coating on an input face and this causes an image to appear at the output face.

---

There are many applications in aircraft, vessels, factories and so on, where the operator is remote from the machinery he controls, in which information such as characters, numbers or other indicia, must be remotely displayed. The ability of fiber optic bundles to transmit light from one point to another along a bent or twisted path makes them attractive for such use. However, it is important in this use that the fibers be in the same position at one end face of the bundle as they are at the other, so that an image of an indicium projected onto one end of the bundle will appear, in relatively undistorted form, at the opposite end face of the bundle.

If it is desired to employ a fiber optic bundle for the display of any one of several numbers or other indicia, the problem becomes more difficult. It is possible to use a number of different masks at the input end of the bundle and mechanically to move them into position, as desired. However, this may mean loss of reliability because of the introduction of mechanical movement into the system and does result in a reduction in operating speed because of the necessity for such mechanical movement.

The object of the present invention is to provide a fiber optic remote display device which is capable of displaying any one of a number of indicia and which: has no moving parts; has substantially no time delay; is flexible and rugged; displays characters which are well-formed; is reliable; and requires, as panel space, an area no larger than that of an end face of the bundle.

The fiber optic image transmitting element of the present arrangement has an output face and one or more input faces. The bundle is made by coating an input face of the element with a light-sensitive medium and then projecting a negative of an image onto the output face of the element. The projected image passes through the fibers of the bundle and exposes the light-sensitive medium on at least a portion of the input face. The exposed light-sensitive medium is then developed and fixed. To operate the bundle, light is projected through the input face of the element, thereby producing a positive image on the output face of the element.

The invention is discussed in greater detail below and is shown in the following drawings, of which:

Figure 1:
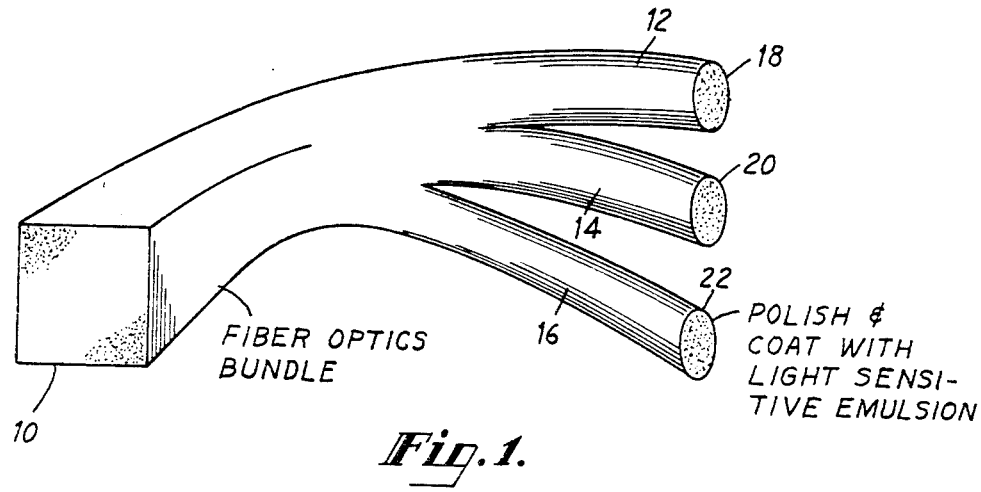
FIGURE 1 is a sketch showing a fiber optic bundle which may be employed in the invention.

The fiber optic bundle of FIGURE 1 includes a viewing surface 10 at one end (the output face) of the bundle. The bundle is divided at its opposite end into a plurality of sub-bundles. For purposes of illustration, three sub-bundles 12, 14 and 16 are illustrated. Each sub-bundle is polished to a smooth face at its terminating end (input face) as shown at 18, 20 and 22, respectively.

It is not necessary in the bundle shown in FIGURE 1 that the fibers in each sub-bundle be in the same general position at the input faces 18, 20 and 22 as they are at the output face 10. In other words, the bundle may be non-coherent. However, it is desirable that the fibers of each sub-bundle be reasonably well distributed over the entire output face 10.

Figure 2:
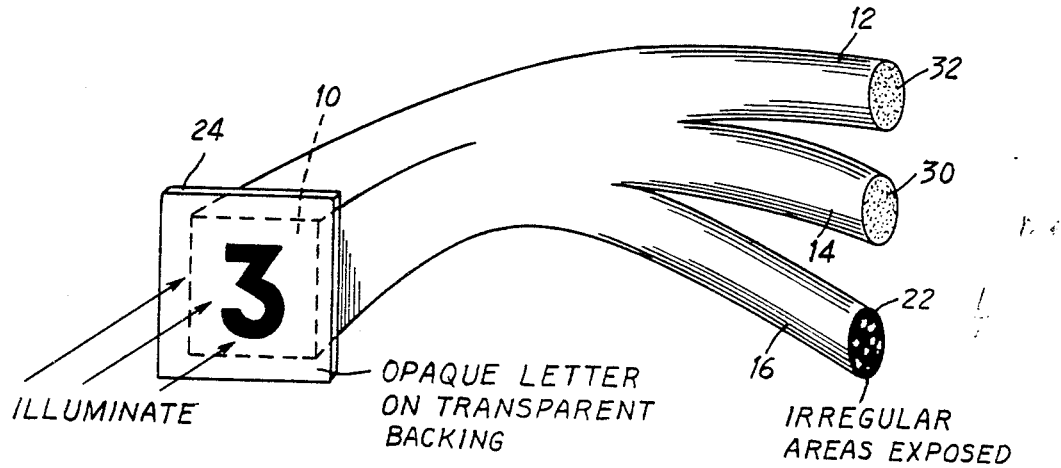
FIGURE 2 shows the same bundle as FIGURE 1 and illustrates a step in the process of making the bundle suitable for displaying a number.
Figure 3:
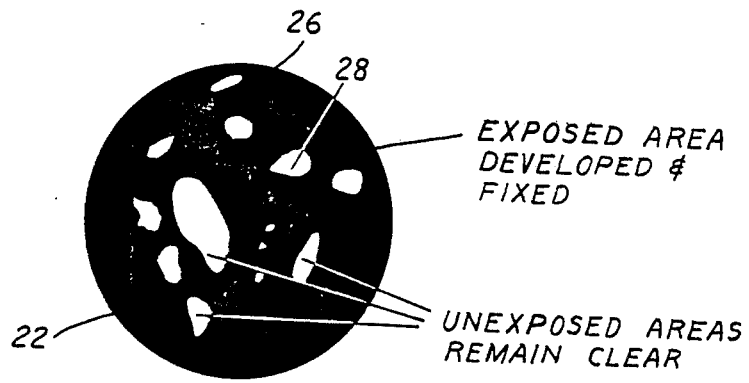
FIGURE 3 is an enlarged view of an input face of the bundle.

The steps of adapting the bundle of FIGURE 1 for use as a display device are illustrated in FIGURES 1, 2 and 3. First, one of the sub-bundles, such as 16, is selected and its polished end surface 22 is coated with a light-sensitive emulsion, such as one of the silver halides commonly used in photographic work. Then, a "mask" consisting of an opaque character on a transparent backing, such as shown at 24 in FIGURE 2, is placed over the viewing surface 10 of the fiber optics bundle and light is projected through the mask. The opaque character prevents light from reaching some of the fibers. The remaining fibers, however, do carry light and cause the light-sensitive emulsion to become exposed. The exposed area is shown at 26 in FIGURE 3, and the unexposed areas are shown at 28.

After the light-sensitive material has been exposed sufficiently, it is developed and fixed. The result is shown in FIGURE 3. Part of the surface 22 of the sub-bundle 16 is clear, and part of the surface is opaque. Since the fiber ends at the input face 22 do not necessarily correspond in position to the fiber ends at the output face 10, the developed image at face 22, in general, is not of the same shape as or in the same position as the character on the mask 24. Instead, the image generally appears as a random array of small spots or areas, as illustrated schematically in FIGURE 3.

The same procedure as above is followed for the other sub-bundles 14 and 12, using different masks. For example, a mask with the letter 2 may be used to expose the surface 30 of sub-bundle 14, and a mask with another letter, such as 4 may be used to expose the surface 32 of sub-bundle 12.

Figure 4:
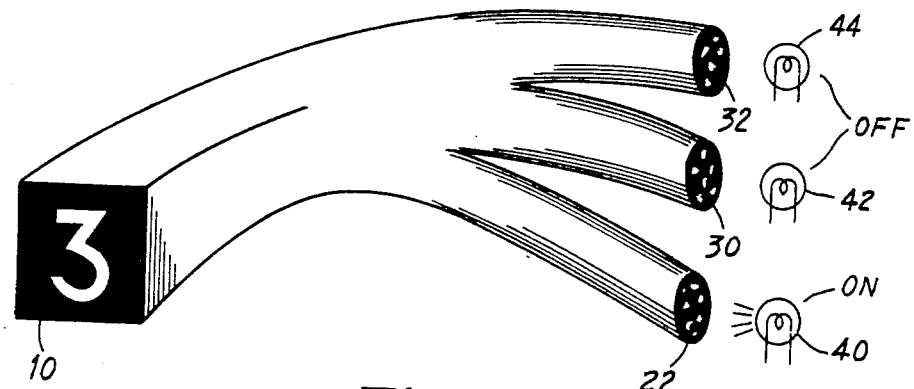
FIGURE 4 shows the bundle in use as a display device.

FIGURE 4 illustrates how the display of the invention operates. Lamps such as 40, 42 and 44 are placed next to the faces 22, 30 and 32. When a lamp such as 40 is turned on light passes through the clear areas 28, which will be recalled are the areas which were prevented from being exposed by the opaque character 3. This light travels down the fiber optic elements and appears as the number 3 on the viewing surface 10. The remainder of the viewing surface surrounding the number 3 is dark, as light is prevented from reaching it by the opaque coating 26 of FIGURE 3. If lamp 40 is turned off and lamp 42 is turned on, a different letter appears on the viewing surface 10, and so on.

As the number of sub-handles is increased and the number of characters desired to be displayed on the surface 10 is increased accordingly, there is a gradual loss of illumination. This may be compensated for by increasing the size of the lamps. With respect to definition: the fibers in the bundle may be two or three mils or less in diameter. This permits a large number of fibers to be used in the bundle and minimizes the problem of loss of definition.

Although discussed in terms of a remote display, the fiber optic bundle of the invention has other uses. For example, it is useful in connection with the display of colored pictures. The original picture is placed over the viewing surface and color separation filters are employed between the image and the surface. In this way, the three sub-bundle faces 22, 30 and 32 of FIGURE 4 become coded color separation negatives. After development and fixing of the faces 22, 30 and 32, if the three lamps 40, 42 and 44 are turned on, a full color picture is reconstituted. The lamps may be of different colors to accomplish this, or the lamps may be white and appropriate color filters employed. If the light are turned on individually, one at a time, color separation negatives are produced at the viewing surface 10.

Although in the embodiments of the invention illustrated, the mask 24 has an opaque image on a transparent background as the "negative," the mask can instead have a transparent image surrounded by an opaque area. The term "negative" in the claims is meant to be generic to both.

What is claimed is:
1. A fiber optic image translating device comprising:
a fiber optic device having a single, non-coherent bundle of fibers terminated at one end thereof in an output face, and formed into a plurality of bundles of fibers at the opposite end thereof, each terminated in an input face, said device having a number of fibers at its output face substantially equal to the total number of fibers in all input faces, and the fibers of each input face being distributed over at least a substantial area of the output face;
a fixed photographic medium on each said input face, previously exposed, in each case, by passing light through a mask in front of the output face of said device; and
a light source adjacent to each said input face.

2. A fiber optic image translating device comprising:
a fiber optic device having a single, non-coherent bundle of fibers at one end thereof terminated in an output face and formed into a plurality of bundles of fibers at the opposite end of said device, each terminated in an input face, the fibers of each input face being relatively widely distributed over the output face;
a fixed photographic medium on each said input face, previously exposed, in each case, by passing light through a mask in front of the output face of said device; and
a light source adjacent to each said input face.

3. A fiber optic image translating device comprising:
a fiber optic device having a single, non-coherent bundle of fibers at one end thereof terminated in an output face and formed into a plurality of bundles of fibers at the opposite end thereof, each terminated in an input face, the fibers of each input face being relatively widely distributed over the output face;
a fixed photographic medium on each said input face, representing, in each case, a positive of an image which may be distorted but which, when illuminated, appears as a relatively undistorted image at said output face; and
illuminating means for each said input face.

References Cited

UNITED STATES PATENTS

| | | | |
|---|---|---|---|
| 1,776,527 | 2/1927 | Uher | 95—4.5 |
| 2,992,587 | 7/1961 | Hicks et al. | 81—1 |
| 3,043,179 | 7/1962 | Dunn | 250—227 X |
| 3,109,065 | 2/1960 | McNaney | 250—227 X |
| 3,313,940 | 4/1967 | Goodrich | 250—213 |

OTHER REFERENCES

Kapany, N.S.: Electro-Optical Systems using fibre optics. In Optica Acta 7(3) p. 213, July 1959.

NORMAN G. TORCHIN, Primary Examiner

R. E. FICHTER, Assistant Examiner

U.S. Cl. X.R.
88—1; 250—227